W. E. WOODARD.
TRAILER TRUCK FOR LOCOMOTIVES.
APPLICATION FILED AUG. 21, 1920.

1,381,532.

Patented June 14, 1921.
3 SHEETS—SHEET 1.

Inventor
William E. Woodard
By F. R. Cornwall Atty.

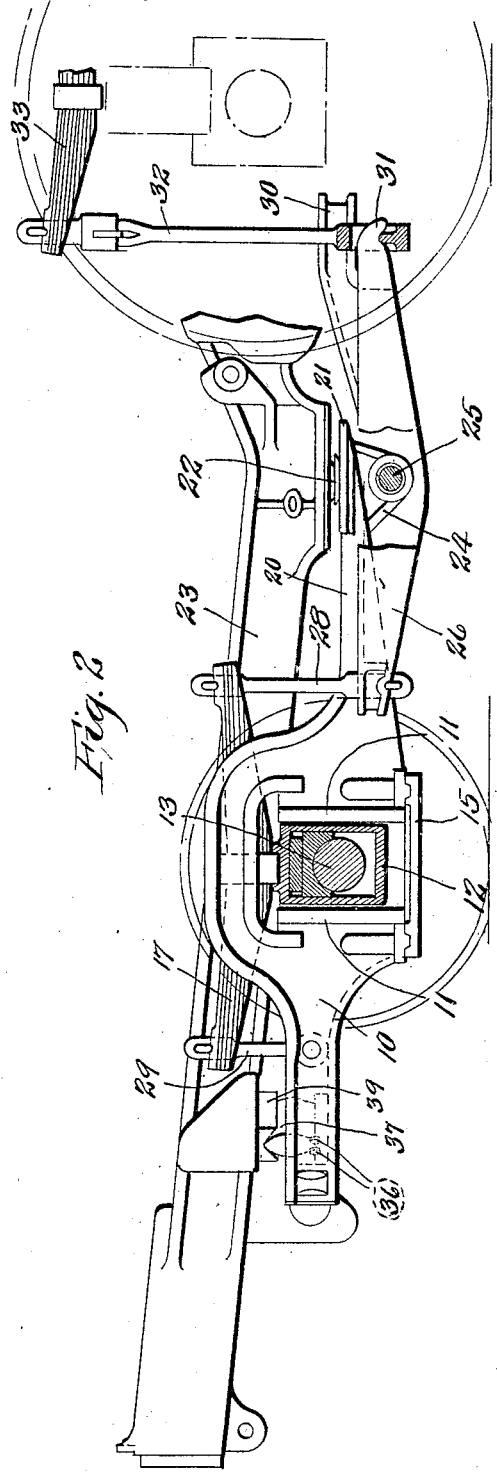
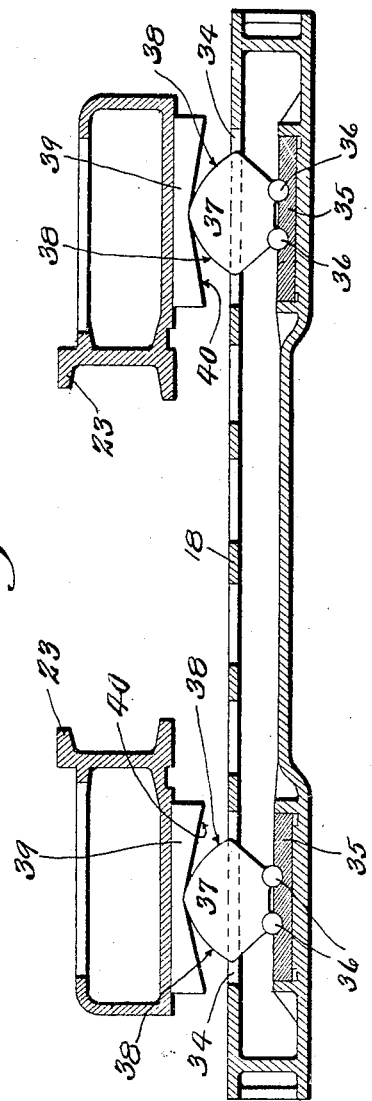

W. E. WOODARD.
RAILER TRUCK FOR LOCOMOTIVES.
APPLICATION FILED AUG. 21, 1920.
1,381,532.
Patented June 14, 1921.
3 SHEETS—SHEET 3.
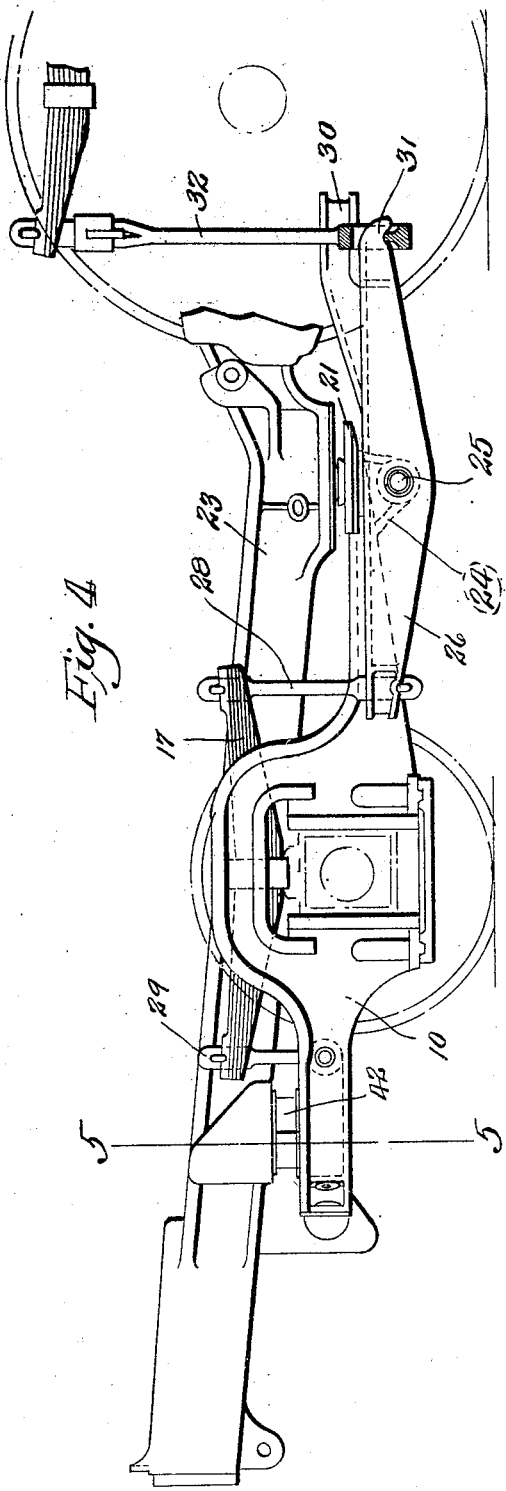
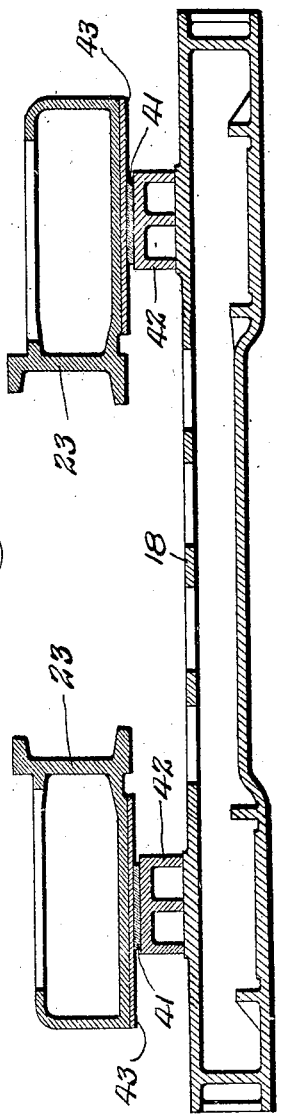
Inventor
William E. Woodard
By F. R. Cornwall, Atty

UNITED STATES PATENT OFFICE.

WILLIAM E. WOODARD, OF FOREST HILLS, NEW YORK, ASSIGNOR TO COMMONWEALTH STEEL COMPANY, OF ST. LOUIS, MISSOURI, A CORPORATION OF NEW JERSEY.

TRAILER-TRUCK FOR LOCOMOTIVES.

1,381,532. Specification of Letters Patent. Patented June 14, 1921.

Application filed August 21, 1920. Serial No. 405,062.

*To all whom it may concern:*

Be it known that I, WILLIAM E. WOODARD, a citizen of the United States, residing at Forest Hills, county of Queens, and State of New York, have invented a certain new and useful Improvement in Trailer-Trucks for Locomotives, of which the following is a full, clear, and exact description, such as will enable others skilled in the art to which it appertains to make and use the same, reference being had to the accompanying drawings, forming part of this specification.

My invention relates generally to trailer trucks for locomotives, and more particularly to the type of trailer truck disclosed in United States Letters Patent No. 1,099,376, issued June 9th, 1914; No. 1,160,874, issued November 16, 1915, and No. 1,210,124, issued December 26, 1916.

The principal objects of my invention are to generally improve upon and simplify the construction of the trucks disclosed in the aforesaid patents as well as other existing types of trailer trucks; to provide a strong and substantial trailer truck having a relatively high degree of flexibility so that it will yield readily while in service; to provide in a structure of the type to which my invention relates a forked or "wish-bone" shaped member that is directly connected to the main frame or cradle of the locomotive, to the rear driver's springs of the locomotive, and to the trailer truck springs so as to perform the functions of an equalizer; further, to provide bearings for this forked or wishbone shaped equalizing member on the forward portion of the trailer truck frame; and, further, to provide improved bearings between the rear portions of the locomotive and the trailer truck frame.

With the foregoing and other objects in view, my invention consists in certain novel features of construction and arrangement of parts, hereinafter more fully described and claimed, and illustrated in the accompanying drawings, in which—

Fig. 2 is a side elevational view of the trailer truck frame and equalizer and also showing a portion of the locomotive frame that is supported by the trailer truck.

Fig. 3 is an enlarged cross section taken approximately on the line 3—3 of Fig. 1.

Fig. 4 is an elevational view of a modified form of a trailer truck.

Fig. 5 is an enlarged cross section taken approximately on the line 5—5 of Fig. 4.

Figure 1:
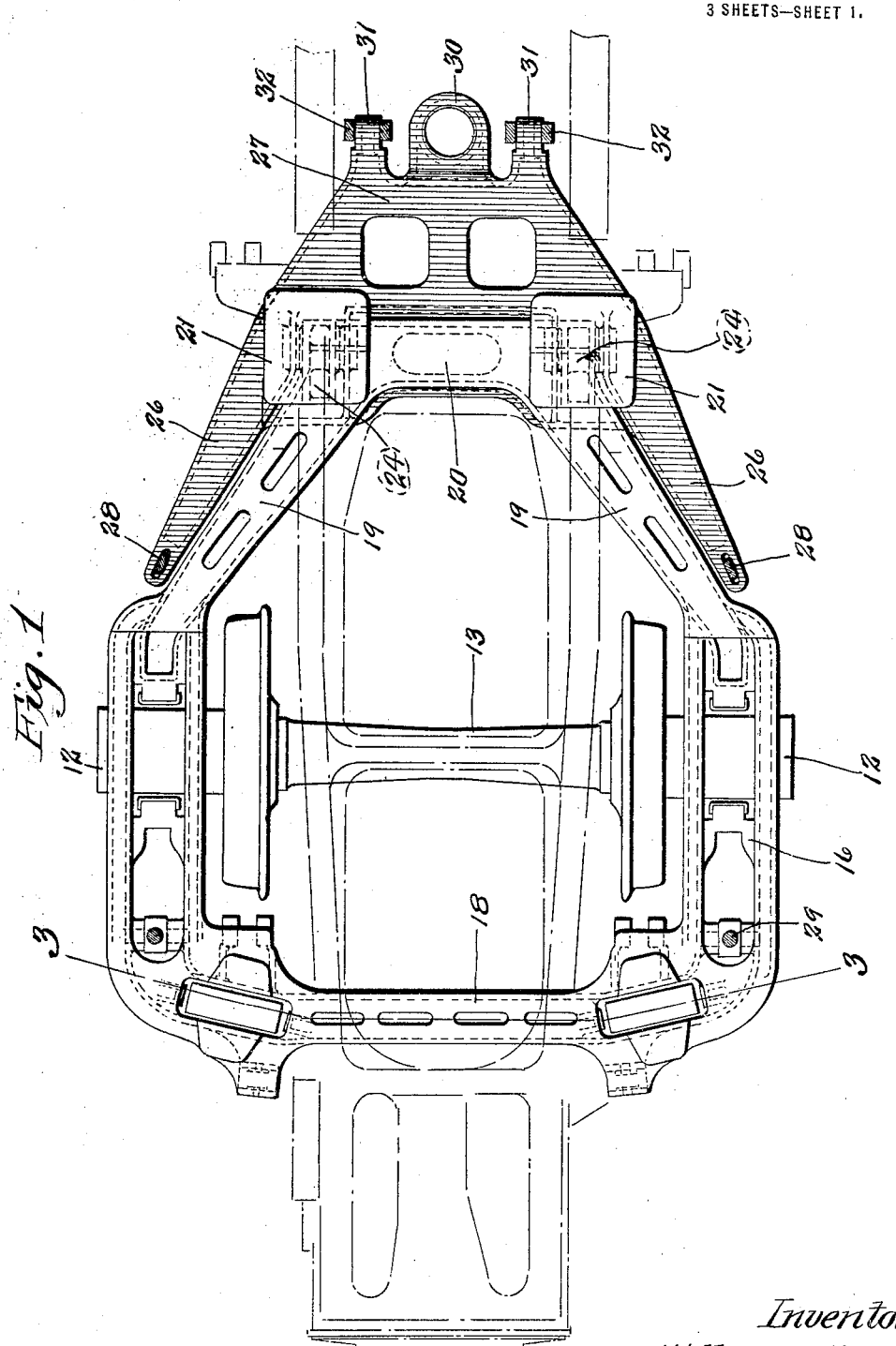
Figure 1 is a top plan view of a trailer truck of my improved construction and the equalizer member that is combined therewith.

Referring by numerals to the accompanying drawings, and particularly to the construction illustrated in Figs. 1, 2 and 3, 10 designates the side members of the trailer truck frame, said members being substantially of inverted U-shape and the inner portions of the vertical legs thereof forming pedestals 11 between which are positioned the journal boxes 12 which receive the ends of the trailer truck axle 13.

Suitable tie plates 15 connect the lower portions of the corresponding pairs of pedestals. The upper portions of the side members 10 are provided with longitudinally disposed openings 16 for the accommodation of semi-elliptic trailer truck springs 17, the same being supported by the journal boxes 12.

Formed integral with or fixed to the rear end portions of side members 10 are the ends of the rear rail 18 of the trailer truck frame, said rail being either box or of inverted U-shape in cross section. Formed integral with or fixed to the forward portions of the side members 10 are the rear ends of rails or frame members 19, the same converging toward the medial line of the truck and the forward ends of these members are connected by a short transversely disposed rail 20.

Formed integral with or fixed to the ends of rail 20 and on the top thereof are horizontally disposed plates 21, upon which are arranged friction pads 22, the latter serving as supports for the front portion of the rear member 23 of the locomotive frame or cradle.

The parts entering into the construction of the trailer truck frame, that is, the side members 10, the rear rail 18, the converging rails 19, and front rail 20, are preferably formed integral with each other, thereby providing a one-piece structure, although if desired, the parts may be separately formed and secured to each other by means of rivets, bolts or the like.

Formed integral with the under sides of the end portions of rail 20 and directly beneath the central portions of the plates 21 are depending lugs 24, the same being arranged in pairs and each pair serving as a bearing for a horizontally disposed pin or bolt 25.

Fulcrumed upon these pins or bolts are the converging arms 26 of a forked or "wishbone" shaped equalizer member, the forward portions of said arms being united by an integrally formed box-like structure 27, the same being reinforced by ribs or flanges, as desired. The arms 26 which diverge rearwardly occupy positions immediately outside and adjacent to the converging arms or rails 19 and pivotally connected to the rear ends of said arms are the lower ends of hangers 28, the upper ends thereof being suspended from the forward ends of the trailer truck springs 17.

Hangers 29 are suspended from the rear ends of these springs 17 and the lower ends of said hangers are pivotally connected to the rear portions of side frames 10. Formed integral with or fixed to the forward member 27 of the equalizer is a forwardly projecting lug or bracket 30 which is provided with a vertical aperture, the latter being adapted to receive a pin or the like seated in a part of the locomotive frame or cradle. Thus the equalizer comprising the parts 26 and 27 and the trailer truck frame which is pivotally connected to said equalizer by means of pins 25, are pivotally connected to the locomotive frame in such a manner as to swing laterally with respect thereto and which swinging action takes place as the truck passes around curved portions of the track.

Formed integral with member 27 to the sides of lug or bracket 30 are forwardly projecting lugs 31 to which are pivotally connected the lower ends of hangers 32, the upper ends of the latter being suspended from the rear ends of the rear driver springs 33, and which latter it will be understood are supported upon the journal boxes for the rear driver axle. (See Fig. 2).

Suitable means is provided for supporting the rear portion of frame 23 upon rear rail 18 and this supporting means may be in the form of three-point self-centering rockers of the type disclosed in Fig. 3, or said supporting means may be in the form of ordinary friction pads of the type illustrated in Fig. 5.

In the event that the three-point self-centering rockers are used, the top plate of rear rail 18 is provided near its ends with the openings 34 and arranged within said rear rail and upon the bottom thereof, below these openings are bearing plates 35. Arranged in suitable bearings formed in each plate is a pair of cylindrical members 36 that are disposed transversely with respect to the said rail and said members serve as supports and bearings for a rocker 37. The top of this rocker is formed with a pair of oppositely arranged convex surfaces 38 and bearing on top of each rocker is a plate 39 that is carried by a part of the locomotive frame 23. The under side of each plate 39 is provided with a pair of oppositely arranged inclined surfaces 40, the same gradually declining from a central point of the plate 39 and under normal condition, or when the trailer truck frame occupies its normal central position, the center of each plate 39 bears directly upon the apex of the corresponding rocker 37 or the point between the oppositely disposed convex bearing surface 38. (See Fig. 3).

In the event that the rear portion of frame 23 is supported by friction pads, the latter in the form of plates 41 are positioned between the upper surfaces of blocks 42 carried by the rear rail 18 and the under surfaces of plates 43, the latter being carried by parts of the frame 23 (see Fig. 5).

In service the main frame 10 of the trailer truck is yieldingly supported by means of springs 17 upon the trailer truck axle and the equalizer member is capable of rocking vertically upon its horizontal axis, consisting of the pins or bolts 25 and which latter pivotally secure said equalizer member to said truck frame.

Obviously, this arrangement provides a flexible yet strong and substantial support for that portion of the locomotive frame that is carried by the trailer truck frame. Further, the equalizer member connected front and rear to driver springs and the trailer truck springs, respectively, is effective in equalizing the weight supported by said springs.

In the event that rocking supports of the type illustrated in Fig. 3 are utilized in supporting the rear portion of the locomotive frame 23, the rockers 37 by virtue of their peculiar construction perform the functions of centering devices and tend to restore the trailer truck frame to its normal central position after it has shifted laterally in either direction.

In the event of lateral movement of the trailer truck frame, the convex bearing surfaces 38 will ride upon the corresponding faces 40 of the blocks 39 and the rockers will rock or bear upon one of the cylindrical members 36 of each pair, and during such movement, there will be a slight downward movement of the rear portion of the trailer truck frame with respect to the locomotive frame or cradle.

In the event that ordinary friction pads are used between the rear portions of the trailer truck frame and the locomotive frame, the plates 43 will slide freely over the side pads and the two frames will always maintain their relative horizontal positions.

A trailer truck of my improved construction is comparatively simple, provides a flexible yet firm and substantial support for the rear portion of the locomotive frame, is effective in yieldingly resisting all ordinary stresses developed in service and is very efficient in performing its intended functions.

It will be readily understood that minor changes in the size, form and construction of the various parts of my improved trailer truck frame may be made and substituted for those herein shown and described, without departing from the spirit of my invention, the scope of which is set forth in the appended claims.

I claim:

1. The combination with a trailer truck frame, an axle carried thereby and springs supported by said axle, of an equalizer member pivotally connected to the forward end of the trailer truck frame, said equalizer member including a pair of diverging arms, the rear ends of which are connected to the trailer truck springs and the forward end of said equalizer member being connected to the rear driver springs of the locomotive with which the trailer truck is associated.

2. The combination with a trailer truck frame, an axle carried thereby and springs supported by said axle, of an equalizer member pivotally connected to the forward end of the trailer truck frame, said equalizer member including a pair of diverging arms, the rear ends of which are connected to the trailer truck springs, the forward end of said equalizer member being connected to the rear driver springs of the locomotive with which the trailer truck is associated, and said forward end being pivotally connected to a part of said locomotive frame.

3. The combination with a trailer truck frame, an axle carried thereby and springs supported by said axle, of an equalizer member pivotally connected to the forward end of the trailer truck frame, said equalizer member including a pair of diverging arms, the rear ends of which are connected to the trailer truck springs, the forward end of said equalizer member being connected to the rear driver springs of the locomotive with which the trailer truck is associated, and bearings on the front and rear portions of the trailer truck frame for the frame of the locomotive with which said trailer truck is associated.

4. In a trailer truck for locomotives, a truck frame, a wheel carrying axle associated therewith, springs supported by said axle, an equalizer member pivotally connected to the forward portion of said trailer truck frame and arranged to swing vertically with respect thereto, said equalizer member including a pair of diverging arms, and connections between said arms and the forward ends of the trailer truck springs.

5. In a trailer truck for locomotives, a truck frame, a wheel carrying axle associated therewith, springs supported by said axle, an equalizer member pivotally connected to the forward portion of said trailer truck frame and arranged to swing vertically with respect thereto, said equalizer member including a pair of diverging arms, connections between said arms and the forward ends of the trailer truck springs, and connections between the rear ends of said trailer truck springs and the trailer truck frame.

6. In a trailer truck for locomotives, a truck frame, a wheel carrying axle associated therewith, springs supported by said axle, an equalizer member pivotally connected to the forward portion of said trailer truck frame and arranged to swing vertically with respect thereto, said equalizer member including a pair of diverging arms, connections between said arms and the forward ends of the trailer truck springs, and supports on the front and rear portions of the trailer truck frame for the frame of the locomotive with which the trailer truck is associated.

7. In a trailer truck for locomotives, a truck frame, a wheel carrying axle associated therewith, springs supported by said axle, an equalizer member pivotally connected to the forward portion of said trailer truck frame and arranged to swing vertically with respect thereto, said equalizer member including a pair of diverging arms, connections between said arms and the forward ends of the trailer truck springs, connections between the rear ends of said trailer truck springs and the trailer truck frame, and supports on the front and rear portions of the trailer truck frame for the frame of the locomotive with which the trailer truck is associated.

8. The combination with a trailer truck frame, of a one-piece equalizer member associated therewith, said member comprising a pair of diverging arms which are pivotally connected at points intermediate their ends to the forward portion of the trailer truck frame, and the forward end of said equalizer member being constructed so as to be connected to parts of the locomotive with which the trailer truck is associated.

9. The combination with a trailer truck frame, its wheel carrying axle and axle supported springs, of an equalizer member pivotally connected to the forward portions of said trailer truck frame, said equalizer member including a pair of rearwardly projecting diverging arms, the rear ends of which are connected to the trailer truck springs, and supports on the forward portion of the trailer truck frame adjacent to the points of pivotal connection between said frame and equalizer member which supports are adapted to receive parts of the locomotive frame.

10. The combination with a trailer truck frame, its wheel carrying axle and axle supported springs, of an equalizer member pivotally connected to the forward portions of said trailer truck frame, said equalizer member including a pair of rearwardly projecting diverging arms, the rear ends of which are connected to the trailer truck springs, supports on the forward portion of the trailer truck frame adjacent to the points of pivotal connection between said frame and equalizer member which supports are adapted to receive parts of the locomotive frame, and supports on the rear portion of the trailer truck frame for parts of the locomotive frame.

11. The combination with a locomotive frame, of an equalizer member flexibly connected thereto and adapted to swing in a horizontal plane, said equalizer member including a pair of rearwardly projecting diverging arms, a trailer truck frame pivotally connected to the arms of the equalizer member at points intermediate their ends, a wheel carrying axle journaled in the trailer truck frame, springs supported by said axle, and connections between the forward ends of said springs and the rear portions of the arms of the equalizer.

12. The combination with a locomotive frame, of an equalizer member flexibly connected thereto and adapted to swing in a horizontal plane, said equalizer member including a pair of rearwardly projecting diverging arms, a trailer truck frame pivotally connected to the arms of the equalizer member at points intermediate their ends, a wheel carrying axle journaled in the trailer truck frame, springs supported by said axle, connections between the forward ends of said springs and the rear portions of the arms of the equalizer, and connections between the rear portions of the trailer truck springs and the trailer truck frame.

13. The combination with a locomotive frame, of an equalizer member flexibly connected thereto and adapted to swing in a horizontal plane, said equalizer member including a pair of rearwardly projecting diverging arms, a trailer truck frame pivotally connected to the arms of the equalizer member at points intermediate their ends, a wheel carrying axle journaled in the trailer truck frame, springs supported by said axle, connections between the forward ends of said springs and the rear portions of the arms of the equalizer, connection between the rear portions of the trailer truck springs and the trailer truck frame, and supports on the front and rear portions of the trailer truck frame for the frame of the locomotive with which the trailer truck is associated.

14. In a locomotive trailer truck, a wishbone shaped equalizing member, the legs of which span a part of said trailer truck.

15. The combination with a locomotive frame, a trailer truck frame, and the springs associated therewith, of a wish-bone shaped equalizing member associated with said locomotive frame, trailer truck frame, and springs.

16. The combination with a locomotive frame, and trailer truck frame, of a wishbone shaped equalizer yieldingly supported adjacent to its ends and fulcrumed intermediate its ends upon the trailer truck frame.

17. The combination with a locomotive frame, a trailer truck frame and the springs associated therewith, of a fulcrumed wishbone shaped equalizer interposed between the locomotive springs and trailer truck springs.

18. The combination with a trailer truck frame and its springs and a locomotive frame, of a wish-bone shaped equalizer pivotally connected adjacent to its forward end to the locomotive frame, and the rear ends of the arms of said equalizer being connected to the trailer truck springs.

19. The combination with a trailer truck frame and its springs and a locomotive frame, of a wish-bone shaped equalizer pivotally connected adjacent to its forward end to the locomotive frame, the rear ends of the arms of said equalizer being connected to the trailer truck springs, and said equalizer member being fulcrumed intermediate its ends upon the trailer truck frame.

20. In a trailer truck, an equalizing member comprising a pair of rigidly connected arms which are angularly disposed with respect to each other and with respect to the medial line of the trailer truck frame.

21. In a trailer truck, an equalizing member comprising a pair of rigidly connected arms which are angularly disposed with respect to each other and with respect to the medial line of the trailer truck frame, and said equalizing member being fulcrumed on the forward portion of the trailer truck frame.

22. The combination with a locomotive frame, a trailer truck frame, and the springs associated therewith, of an equalizer comprising a pair of rigidly connected arms that are angularly disposed with respect to each other and with respect to the medial line of the locomotive and trailer truck frames, the ends of said arms being connected to the locomotive and trailer truck springs.

23. The combination with a locomotive frame, a trailer truck frame, and the springs associated therewith, of an equalizer comprising a pair of rigidly connected arms that are angularly disposed with respect to each other and with respect to the medial line of the locomotive and trailer truck frames, the ends of said arms being connected to the locomotive and trailer truck springs, and said equalizing member being fulcrumed upon the forward portion of the trailer truck frame.

In testimony whereof I hereunto affix my signature this 29th day of July, 1920.

WILLIAM E. WOODARD.